W. E. KIDNEY.
MEAT SLICING MACHINE.
APPLICATION FILED MAR. 10, 1920.
1,378,872.
Patented May 24, 1921.
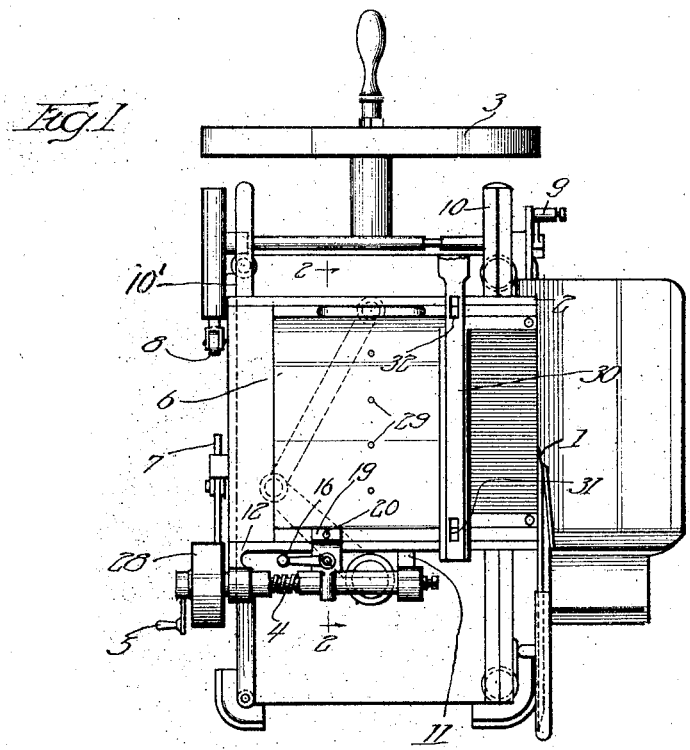
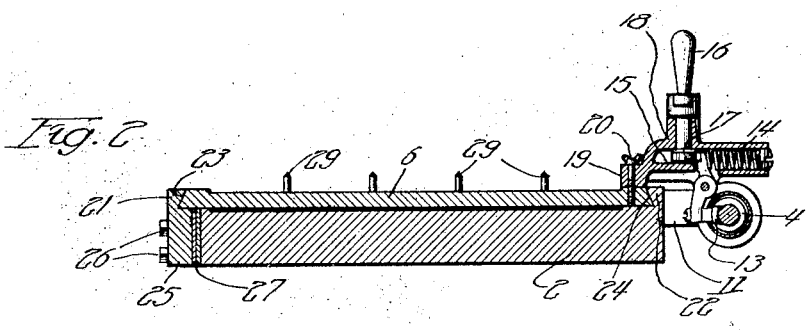
Inventor
W. E. Kidney

UNITED STATES PATENT OFFICE.

WILLIS E. KIDNEY, OF CLEVELAND, OHIO, ASSIGNOR TO THE CLEVELAND ELECTRIC AND MACHINE MFG. CO., OF CLEVELAND, OHIO.

MEAT-SLICING MACHINE.

1,378,872.     Specification of Letters Patent.     Patented May 24, 1921.

Application filed March 10, 1920. Serial No. 364,851.

*To all whom it may concern:*

Be it known that I, WILLIS E. KIDNEY, a citizen of the United States, residing at Cleveland, in the county of Cuyahoga and State of Ohio, have invented a certain new and useful Improvement in Meat-Slicing Machines, of which the following is a full, clear, concise, and exact description, reference being had to the accompanying drawings, forming a part of this specification.

My invention relates to meat slicing machines and has for its object the provision of an improved structural arrangement of the meat plate together with its attendant mechanism.

My invention is an improvement on the type of machine shown in U. S. Letters Patent No. 1,243,867, patented Oct. 23, 1917, to John M. Peterson. The machine of this patent contemplates a movable table which is movable periodically across the face of a rotating slicing knife. The meat is carried upon a table which moves periodically closer to the plane of the slicing knife. The meat plate is controlled by a feed screw which controls the periodic movement and the thickness of the slice depends upon the amount of movement of the meat plate during each actuation. The meat plate in said patent is removable, being supported by vertical guide bars upon the traveling table.

I have found that in machinery of this description it is essential that a firm guide be provided for the meat plate so as to prevent any lost motion because the slightest lost motion will be emphasized in the unequal thickness of a given slice. My invention therefore contemplates a meat plate structure of such a character that there is no lost motion between it and the traveling table. The arrangement however of my invention is such that the meat plate may be readily disconnected from certain associated mechanism whereby it is removable and interchangeable so that several meat plates may be utilized with the one slicing machine to prevent resetting different kinds of meat upon one meat plate.

I will describe my invention more in detail by referring to the accompanying drawing illustrating one embodiment thereof, in which—

Figure 1 is a top view of a slicing machine constructed in accordance with my invention; and Fig. 2 is a cross sectional view on line 2—2 of Fig. 1.

The slicing machine as outlined herein with respect to the rotatable slicing knife 1, the traveling table 2, the hand operated fly wheel 3 and the feed screw 4 is a well understood structure and is explained more in detail in the Peterson patent heretofore mentioned. A handle 5 is provided to rotate the feed screw any given desired amount, to set the meat plate 6 into its proper initial position preparatory to slicing, thereafter the feed screw 4 is periodically rotated a certain number of degrees when the cam 7 comes into association with the roller 8. The position of the roller is adjustable by the handle 9 to control the thickness of the slices, all of which is in accordance with the structure set out in the said Peterson patent. The rotation of the fly wheel 3 causes a back and forth movement of the traveling table 2 upon guides 10 and 10' and also causes the rotation of the slicing knife 1.

My invention concerns itself more particularly with the association of the meat plate 6 upon the traveling table 2. The feed screw 4 is carried by suitable brackets 11, 12, projecting from the traveling table 2. The feed screw coöperates with a tooth piece 13 which is normally urged into engagement with the feed screw by a spring 14. A stop 15 is provided which limits the inward movement of the tooth piece 13 toward the feed screw so that there is no spring action after the tooth piece has come substantially to a touching engagement with the feed screw. By means of a handle 16 and cam 17 the tooth piece 13 may be moved out of engagement with the feed screw 4. All of these parts associated with the tooth piece 13 are supported in a housing 18 carried by the meat plate 6. The housing 18 has a bracket 19 which is adapted to rest upon a ridge provided along the edge of the meat plate and is held in engagement with the meat plate by the thumb screw 20. Thus when the handle 16 is actuated to disconnect the tooth piece 13 from the feed screw then the meat plate 6 may be slid into position, roughly speaking, preparatory to the operation of the machine for slicing the meat. A finer initial adjustment can then be made by connecting the tooth piece with the feed screw and operating the handle 5. In order to avoid any lost motion between the meat plate and the traveling table and yet permit the meat plate to be removable, I mount the meat plate in guides 21, 22 having inclined surfaces 23, 24, and provide the meat plate with coöperating inclined guide surfaces. In thus arranging for inclined guide means between the meat plate and the traveling table an accurate fit can be arranged for which will prevent the occurrence of lost motion.

In order to maintain this proper adjustment at all times the guide 21 is mounted upon a separable section 25 of the traveling table held in place by adjustable nuts 26, suitable shims 27 being provided to regulate the adjustment. The operation of the meat plate is thus confined to a proper movement without lost motion. The meat plate however is removable so that it may be interchangeable by disconnecting the housing 18 from the meat plate 6 through the agency of the thumb screw 20. Upon removal of the housing 18 the meat plate may be slid out of its bearings past the housing 28 which would prevent withdrawal of the meat plate with the housing 18 in position. The meat plate as thus removed is free from the feed screw structure so that but one feed screw structure may be utilized regardless of the number of interchangeable meat plates which it may be desirable to have. The meat plate is provided with suitable prongs 29 to more thoroughly hold the meat in position and the customary clamp 30 is provided to clamp thereon the meat, this clamp operating along standards 31 and 32.

From what has thus been described the nature of my invention will be readily apparent to those skilled in the art, and it will also be readily apparent that a very simple meat plate structure is provided having the minimum amount of mechanism associated therewith.

Having thus described my invention what I claim as new and desire to secure by Letters Patent is:

1. A device of the character described comprising a reciprocating traveling table, a meat carrying plate slidably mounted on said table, said meat carrying plate and said table having coöperating guides inclined upwardly and inwardly, a worm, a housing, a tooth piece carried by said housing engaging said worm, and means for maintaining a snug sliding fit between said meat carrying plate and said table, said means comprising an undercut guide for said meat carrying plate detachably mounted on said table, means for clamping said guide to said table, and means to adjust said guide insertible between said guide and table.

2. A device of the character described comprising a reciprocating traveling table, a meat carrying plate slidably mounted on said table, said meat carrying plate and said table having coöperating guides inclined upwardly and inwardly, a worm, a housing, a tooth piece carried by said housing engaging said worm, and means for maintaining a snug sliding fit between said meat carrying plate and said table, said means comprising an undercut guide for said meat carrying plate detachably mounted on said table, means for clamping said guide to said table and shims to adjust said guide insertible between said guide and table.

In witness whereof I hereunto subscribe my name this 3rd day of March A. D., 1920.

W. E. KIDNEY.